United States Patent
Varshney et al.

(10) Patent No.: US 12,444,004 B2
(45) Date of Patent: Oct. 14, 2025

(54) SYSTEMS AND METHODS FOR ROAD INFRASTRUCTURE MANAGEMENT

(71) Applicant: AIDash Inc., Palo Alto, CA (US)

(72) Inventors: Kanishk Varshney, Gurgaon (IN); Mihir Rajendra Kulkarni, Bangalore (IN); Shrijit Basak, Bangalore (IN)

(73) Assignee: AIDash Inc., Palo Alto, CA (US)

( * ) Notice: Subject to any disclaimer, the term of this patent is extended or adjusted under 35 U.S.C. 154(b) by 0 days.

(21) Appl. No.: 18/674,746

(22) Filed: May 24, 2024

(65) Prior Publication Data

US 2025/0252514 A1    Aug. 7, 2025

Related U.S. Application Data

(60) Provisional application No. 63/559,846, filed on Feb. 29, 2024, provisional application No. 63/549,422, filed on Feb. 2, 2024.

(51) Int. Cl.
| | |
|---|---|
| G06Q 50/08 | (2012.01) |
| G06T 7/11 | (2017.01) |
| G06V 20/00 | (2022.01) |
| G06V 30/19 | (2022.01) |

(52) U.S. Cl.
CPC .............. *G06Q 50/08* (2013.01); *G06T 7/11* (2017.01); *G06V 20/00* (2022.01); *G06V 30/19* (2022.01)

(58) Field of Classification Search
CPC .......... G06T 7/11; G06V 20/00; G06V 30/19; G06Q 5/08
USPC ............................................ 382/154
See application file for complete search history.

(56) References Cited

U.S. PATENT DOCUMENTS

| | | | |
|---|---|---|---|
| 10,688,841 B1 * | 6/2020 | Chen | B60G 17/0165 |
| 11,586,843 B1 * | 2/2023 | Pertsel | G06V 10/82 |
| 11,829,959 B1 * | 11/2023 | Latif | G05D 1/104 |
| 11,954,844 B2 * | 4/2024 | Kong | G06T 7/001 |
| 2019/0073774 A1 * | 3/2019 | Kwant | G06T 7/143 |
| 2020/0175352 A1 * | 6/2020 | Cha | G06N 3/04 |
| 2021/0350517 A1 * | 11/2021 | Song | G06N 3/088 |
| 2022/0044034 A1 * | 2/2022 | RoyChowdhury | E01C 23/01 |
| 2022/0262111 A1 * | 8/2022 | Yamasaki | G06V 20/588 |
| 2023/0108134 A1 * | 4/2023 | Jumonji | G06T 7/0004 |
| | | | 702/34 |

(Continued)

OTHER PUBLICATIONS

International Application No. PCT/US2025/013861, International Search Report and the Written Opinion, dated Apr. 18, 2025, 13 pages.

*Primary Examiner* — Kenny A Cese
(74) *Attorney, Agent, or Firm* — Ahmann Kloke LLP

(57) ABSTRACT

An example method includes receiving multiple 360-degree images each of which include a portion of a road. Multiple images based on the multiple 360-degree images are generated. One or more road defect detection models are applied to the multiple images. A first defect in a first portion of the road in a first image and a second defect in a second portion of the road in a second image. A determination that the first defect and the second defect are part of a single defect is made. A first location for the first image and a second location for the second image is received. An estimate of one or more locations of the single defect is made based on the first location and the second location. Defect location data that indicates the one or more locations of the single defect is generated and provided.

20 Claims, 10 Drawing Sheets

(56) References Cited

U.S. PATENT DOCUMENTS

2023/0351575 A1* 11/2023 Zou .................... G06V 10/774
2024/0010190 A1* 1/2024 Naes .................... B60W 30/18

* cited by examiner

SYSTEMS AND METHODS FOR ROAD INFRASTRUCTURE MANAGEMENT

CROSS-REFERENCE TO RELATED APPLICATIONS

This application claims priority to and seeks the benefit of U.S. Provisional Patent Application No. 63/549,422, filed on Feb. 2, 2024, and entitled "SYSTEMS AND METHODS FOR ROAD INFRASTRUCTURE MANAGEMENT," and U.S. Provisional Patent Application No. 63/559,846, filed on Feb. 29, 2024, and entitled "SYSTEMS AND METHODS FOR ROAD INFRASTRUCTURE MANAGEMENT," each of which is incorporated in its entirety herein by reference.

FIELD OF THE INVENTION(S)

Embodiments of the present invention(s) are generally related to road defect and road asset detection, and in particular to detecting road defects such as road cracks, and road assets, such as road signs, using trained models.

BACKGROUND

Road surveying and asset monitoring are important functions for transportation departments to effectively manage maintenance, planning, and budgeting. There are many inefficiencies in current approaches to road surveying and asset monitoring. For example, transportation departments manually survey roads to determine what portions of the roads need repairs. Such manual surveying is time-consuming and may not be scalable given the number and extent of roads for which a transportation department may be responsible.

SUMMARY

An example non-transitory computer-readable medium may comprise executable instructions. The executable instructions are executable by one or more processors to perform a method. The method comprises receiving multiple 360-degree images, each 360-degree image including a portion of a road, a 360-degree image captured by one or more 360-degree camera systems and having a timestamp and a location at which the one or more 360-degree camera systems captured the 360-degree image, generating multiple images based on the multiple 360-degree images, an image including the portion of the road in a corresponding 360-degree image, the multiple images ordered by timestamps of corresponding 360-degree images, applying one or more road defect detection models trained to detect defects in a road to the multiple images, detecting, based on applying the one or more road defect detection models to the multiple images, that there is a first defect in a first portion of the road in a first image and that there is a second defect in a second portion of the road in a second image, the second image ordered immediately after the first image, determining that the first defect and the second defect are part of a single defect, receiving at least one of a first location for a first 360-degree image corresponding to the first image and a second location for a second 360-degree image corresponding to the second image, estimating, based on at least one of the first location and the second location, one or more locations of the single defect, generating defect location data that indicates the one or more locations of the single defect, generating a defect report image that includes the single defect and identifies the single defect, and providing the defect location data and the defect report image.

In some embodiments, the one or more road defect detection models include one or more road crack detection models trained to detect cracks in a road. The method may comprise applying the one or more road defect detection models trained to detect defects in the road to the multiple images includes applying the one or more road crack detection models trained to detect cracks in the road to the multiple images and detecting, based on applying the one or more road defect detection models to the multiple images, that there is the first defect in the first portion of the road in the first image and that there is the second defect in the second portion of the road in the second image includes detecting, based on applying the one or more road crack detection models to the multiple images, that there is a first crack in the first portion of the road in the first image and that there is a second crack in the second portion of the road in the second image. The one or more road crack detection models may be trained to detect cracks in a road include: a first road crack detection model trained to detect alligator cracks in the road, a second road crack detection model trained to detect longitudinal cracks in the road, a third road crack detection model trained to detect seal cracks in the road, and a fourth road crack detection model trained to detect transverse cracks in the road.

In various embodiments, generating the defect report image includes: identifying a 360-degree image having a location that is closest to the one or more locations of the single defect and utilizing the 360-degree image having the location that is closest to the one or more locations of the single defect to generate the defect report image. Generating the defect report image may further include: determining an angle between a driving direction of a vehicle on which the one or more 360-degree camera systems was mounted and the single defect and utilizing the angle to generate the defect report image based on the 360-degree image.

The method may further comprise: detecting, based on applying the one or more road defect detection models to the multiple images, that there is third defect in a third portion of the road in the first image, receiving a first confidence score for the first defect, receiving a second confidence score for the third defect, determining that the first confidence score is greater than the second confidence score, determining that an intersection over union for the first defect and the third defect exceeds a threshold, and determining, based on determining that the first confidence score is greater than the second confidence score and determining that the intersection over union for the first defect and the third defect exceeds the threshold, that the third defect is part of the first defect.

In some embodiments, the method further comprises: applying one or more sign detection models trained to detect signs on or proximate to a road to the multiple images, detecting, based on applying the one or more sign detection models to the multiple images, that there is a sign in a third image, receiving a third location for a third 360-degree image corresponding to the third image, estimating, based on the third location, one or more sign locations of the sign, generating sign location data that indicates the one or more sign locations of the sign, generating a sign report image that includes the sign and identifies the sign, and providing the sign location data and the sign report image.

In various embodiments, the method further comprises: segmenting the multiple images and identifying, based on segmenting the multiple images, portions of the road in the multiple images, wherein applying the one or more road defect detection models trained to detect defects in the road to the multiple images includes applying the one or more road defect detection models to the portions of the road in the multiple images.

Estimating, based on at least one of the first location and the second location, the one or more locations of the single defect may, in some embodiments, includes: detecting first features in the first image and second features in the second image, matching at least some of the first features in the first image with at least some of the second features in the second image, generating a matrix using at least some of the first features that are matched with at least some of the second features, determining, using the matrix, one or more positions of the single defect, and aligning, based on least one of the first location and the second location, the one or more positions of the single defect to obtain the one or more locations of the single defect.

An example method comprises receiving multiple 360-degree images, each 360-degree image including a portion of a road, a 360-degree image captured by one or more 360-degree camera systems and having a timestamp and a location at which the one or more 360-degree camera systems captured the 360-degree image, generating multiple images based on the multiple 360-degree images, an image including the portion of the road in a corresponding 360-degree image, the multiple images ordered by timestamps of corresponding 360-degree images, applying one or more road defect detection models trained to detect defects in a road to the multiple images, detecting, based on applying the one or more road defect detection models to the multiple images, that there is a first defect in a first portion of the road in a first image and that there is a second defect in a second portion of the road in a second image, the second image ordered immediately after the first image, determining that the first defect and the second defect are part of a single defect, receiving at least one of a first location for a first 360-degree image corresponding to the first image and a second location for a second 360-degree image corresponding to the second image, estimating, based on at least one of the first location and the second location, one or more locations of the single defect, generating defect location data that indicates the one or more locations of the single defect, generating a defect report image that includes the single defect and identifies the single defect, and providing the defect location data and the defect report image.

An example system comprises at least one processor and memory containing executable instructions. The executable instructions may be executable by the at least one processor to: receive multiple 360-degree images, each 360-degree image including a portion of a road, a 360-degree image captured by one or more 360-degree camera systems and having a location at which the one or more 360-degree camera systems captured the 360-degree image and a timestamp, generate multiple images based on the multiple 360-degree images, an image including the portion of the road in a corresponding 360-degree image, the multiple images ordered by timestamps of corresponding 360-degree images, apply one or more road defect detection models trained to detect defects in a road to the multiple images, detect, based on applying the one or more road defect detection models to the multiple images, that there is a first defect in a first portion of the road in a first image and that there is a second defect in a second portion of the road in a second image, the second image ordered immediately after the first image, determine that the first defect and the second defect are part of a single defect, receive at least one of a first location for a first 360-degree image corresponding to the first image and a second location for a second 360-degree image corresponding to the second image, estimate, based on at least one of the first location and the second location, one or more locations of the single defect, generate defect location data that indicates the one or more locations of the single defect, generating a defect report image that includes the single defect and identifies the single defect, and provide the defect location data and the defect report image.

In some embodiments, the one or more road defect detection models include one or more road crack detection models trained to detect cracks in a road, and the executable instructions may be executable by the at least one processor to apply the one or more road defect detection models trained to detect defects in the road to the multiple images include executable instructions being executable by the at least one processor to apply the one or more road crack detection models trained to detect cracks in the road to the multiple images, and detect, based on applying the one or more road defect detection models to the multiple images, that there is the first defect in the first portion of the road in the first image and that there is the second defect in the second portion of the road in the second image includes executable instructions being executable by the at least one processor to detect, based on applying the one or more road crack detection models to the multiple images, that there is a first crack in the first portion of the road in the first image and that there is a second crack in the second portion of the road in the second image.

BRIEF DESCRIPTION OF THE DRAWINGS

Throughout the drawings, like reference numerals will be understood to refer to like parts, components, and structures.

DETAILED DESCRIPTION

Figure 1:
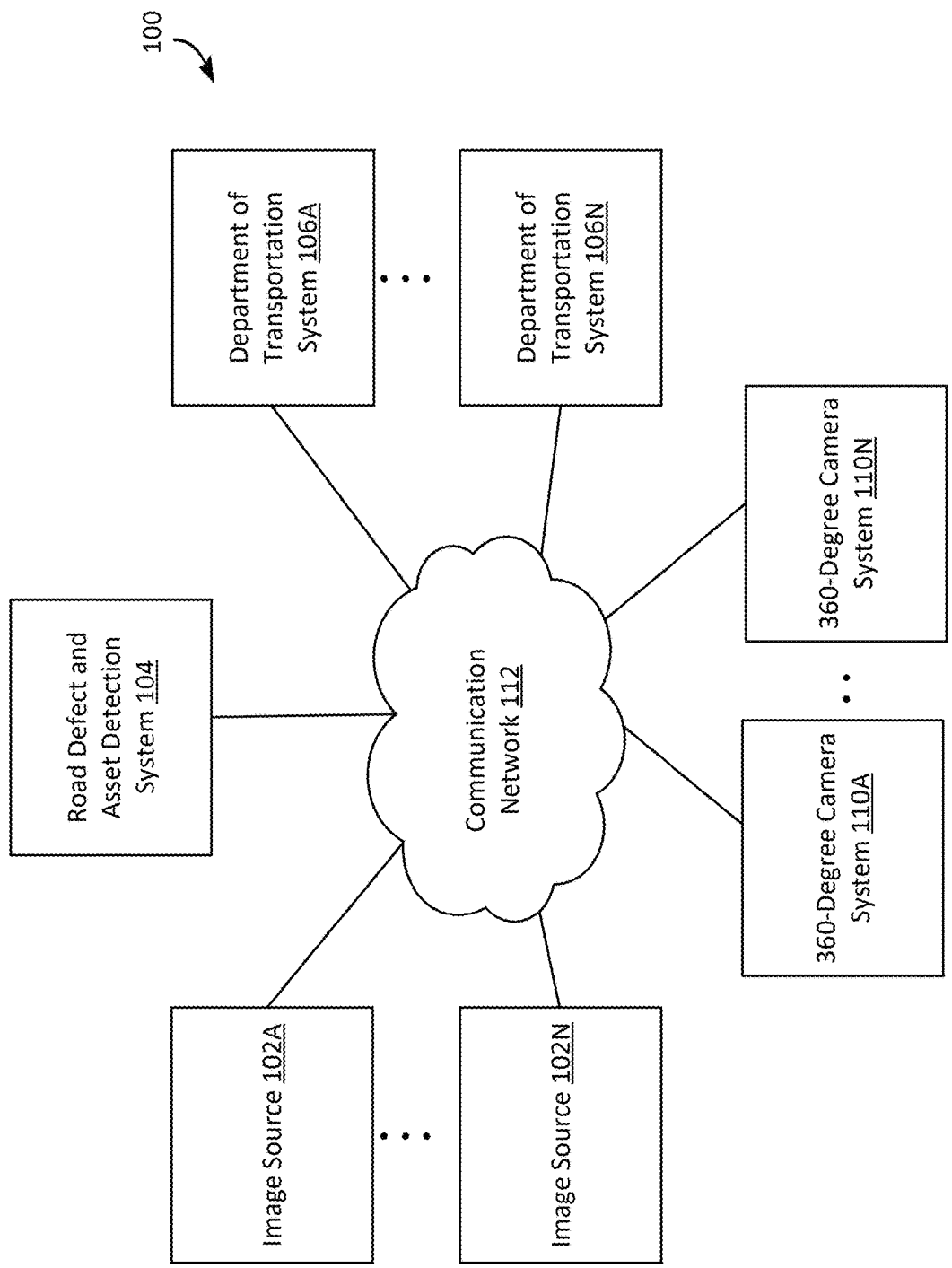
FIG. 1 is a block diagram depicting an example environment in which a road defect and asset detection system may operate in some embodiments.

Prior approaches to road infrastructure management often suffer from limitations in scalability, integration, and automation. These prior efforts typically focus on isolated aspects of road infrastructure management and typically require manual intervention and data aggregation across disparate systems. This fragmented approach limits the efficiency and effectiveness of road infrastructure management by transportation departments. Furthermore, such prior approaches are not scalable to the number and extent of roads and other road infrastructure that transportation departments have to manage.

Various embodiments of road defect and asset detection system as described herein provide technical solutions to technical problems in current approaches to road infrastructure management. In some embodiments, the road defect and asset detection system may automatically ingest images of roads and road infrastructure. The road defect and asset detection system may use artificial intelligence (AI) and/or machine learning (ML) models to automatically detect road defects, such as road cracks, and road assets, such as road signs, in the images. The road defect and asset detection system may automatically generate images identifying road defects and/or road assets as well as location data for the road defects and/or road assets. The road defect and asset detection system may then automatically provide the images and location data to entities such as departments of transportation. The departments of transportation may utilize such information in their road infrastructure management functions, such as managing road defect repair and/or road asset monitoring.

The road defect and asset detection system may efficiently process images for roads in any geographic region, thereby providing useful information to departments of transportation in any geographic region. The road defect and asset detection system may process images of various types of roads, such as paved roads or unpaved roads, and automatically detect various types of road defects, such as cracks or potholes. Furthermore, the road defect and asset detection system may be customizable to account for varied preferences of transportation departments. For example, one transportation department may configure the road defect and asset detection system to notify the department of road cracks that exceed a certain length while another transportation department may configure the road defect and asset detection system to notify them of road cracks that exceed a different length. The road defect and asset detection system may accommodate these and other requirements of transportation departments.

Accordingly, in one or more embodiments, the road defect and asset detection system, by using imagery and the scalable systems and methods described herein, may provide time and cost savings, timely notice of damage to roadways, additional benefits, and other ancillary benefits. It will be appreciated that by analyzing images of large lengths of road, cracks or other damage to the roadway may be identified and notice provided, thereby allowing road damage to be identified, blocked off if dangerous, and/or corrected. Given that millions of people use the roads every day, damage the roads is a threat to the safety and lives of drivers as well as pedestrians. Other benefits of the one or more embodiments of the road defect and asset detection system described herein will be apparent.

FIG. 1 is a block diagram depicting an example environment 100 in which a road defect and asset detection system may operate in some embodiments. The environment 100 includes multiple image sources 102A through 102N (referred to as an image source 102 or as image sources 102), multiple department of transportation systems 106A through 106N (referred to as a department of transportation system 106 or as department of transportation systems 106), a road defect and asset detection system 104, multiple 360-degree camera systems 110A through 110N (referred to as a 360-degree camera system 110 or as 360-degree camera systems 110), and a communication network 112. Each of the image sources 102, the road defect and asset detection system 104, the department of transportation system 106, and the 360-degree camera system 110 may be or include any number of digital devices. A digital device is any device with at least one processor and memory. Digital devices are discussed further herein, for example, with reference to FIG. 9.

Image sources 102 may each be or include a third-party system configured to provide images or access to images of roads or of portions of roads. A portion of a road may be any part of a road, track, or any other surface upon which a vehicle may travel. A road may be paved (for example, asphalt or concrete) or unpaved (for example, dirt or gravel). Different third parties may periodically capture images of roads. For example, some third parties at regular intervals or on-demand may obtain 360-degree images of roads using one or more of the 360-degree camera systems 110. An example 360-degree camera system is a Trimble MX7 by Trimble Inc. of Colorado, United States. Different third parties may obtain images from different sources (for example, different 360-degree camera systems) for the same and/or different roads. The third parties may provide images and/or license access to the images to other businesses for a variety of purposes (e.g., via one or more of the image sources 102).

In some embodiments, any number of the image sources 102 may obtain images of the same road portions and save them over time. As such, an image source 102 may obtain and store images of the same road portions taken on different days, months, or years. For example, an image source 102 may provide images at a first duration of time (for example, taken at a particular time and date). The image source 102 may also provide images at a second duration of time of the same road portions (for example, taken at a different particular time or date such as one or more years before or after the first duration).

Any number of the image sources 102 may provide application programming interfaces (APIs) to enable another system (for example, the road defect and asset detection system 104) to request images for a particular road or portions of roads. The request may be a request for current images and/or for images of the same geographic areas taken at different times. In various embodiments, the road defect and asset detection system 104 may request information on what images are available and at what time frames.

The road defect and asset detection system 104 may receive 360-degree images from the image sources 102 for portions of a road. The road defect and asset detection system 104 may generate non-360-degree images based on the 360-degree images and apply one or more trained artificial intelligence (AI) and/or machine learning (ML) models to the generated images. The road defect and asset detection system 104 may apply one or more trained AI and/or ML models to detect road defects, such as cracks, and one or more trained AI and/or ML models to detect road assets, such as road signs on or proximate to roads. A road defect may include any road imperfection (for example, cracks, potholes). A road asset may include any item on or proximate to roads (for example, road signs, traffic lights). The road defect and asset detection system 104 may then estimate locations of detected defects and road assets and provide the locations of the detected road defects and road assets to various parties, such as to the department of transportation systems 106. Although the environment 100 depicts only one road defect and asset detection system 104, there may be any number of the road defect and asset detection system 104.

A department of transportation system 106 may be operated by a governmental entity, such as a state or municipal department of transportation or similar agency that manages or is otherwise responsible for roads and road infrastructure. In some embodiments, the department of transportation system 106 may represent a private third-party whose job it is (e.g., through contract with a government agency) to track and/or correct roadway damage. A 360-degree camera system 110 may be operated by an entity that captures 360-degree images of roads and licenses such images.

In some embodiments, the communication network 112 may represent one or more computer networks (for example, LAN, WAN, and/or the like). The communication network 112 may provide communication between any of the image sources 102, the road defect and asset detection system 104, the department of transportation system 106, and the 360-degree camera system 110. In some implementations, the communication network 112 comprises computer devices, routers, cables, and/or other network topologies. In some embodiments, the communication network 112 may be wired and/or wireless. In various embodiments, the communication network 112 may comprise the Internet, one or more networks that may be public, private, IP-based, non-IP based, and so forth.

Figure 2:
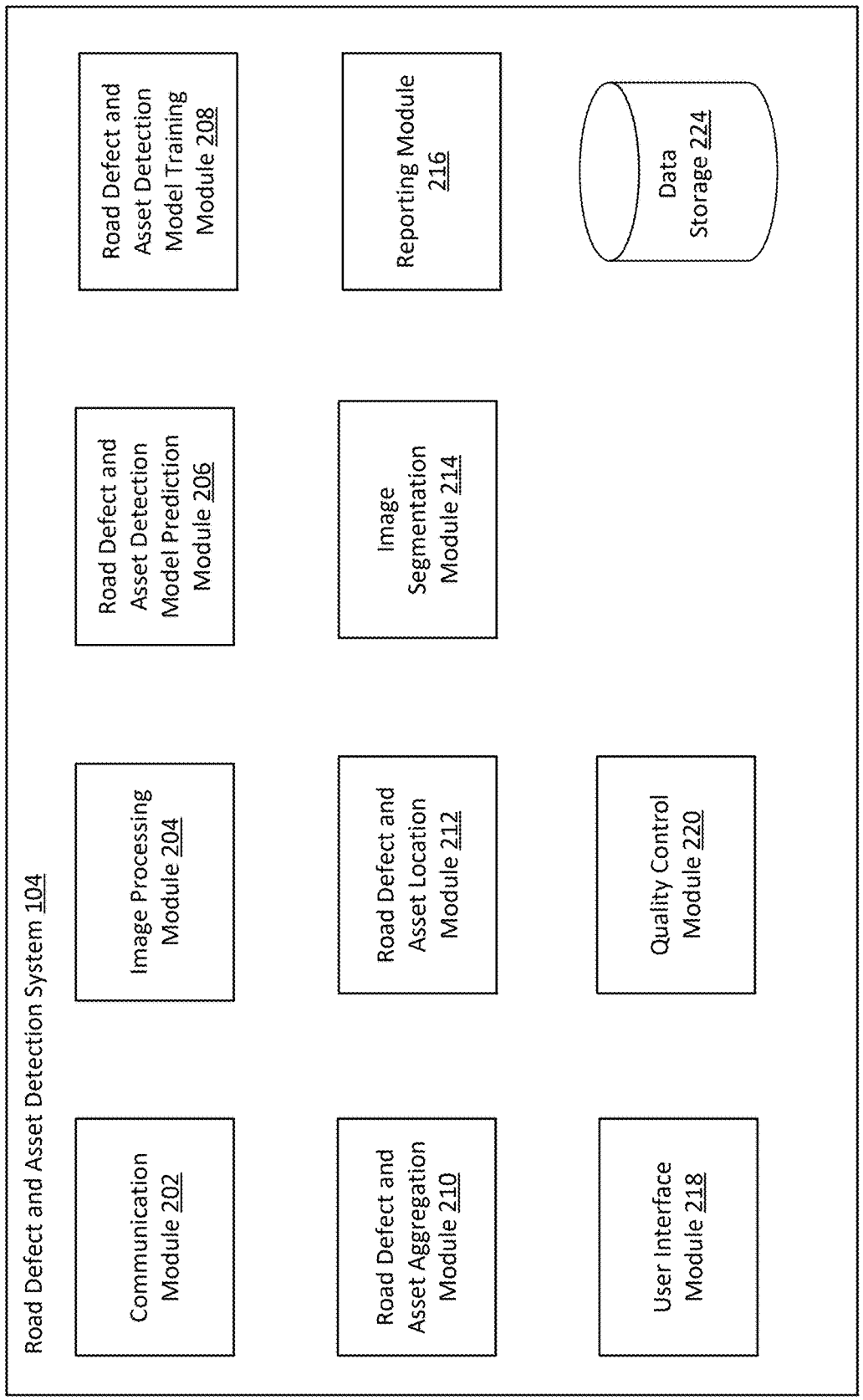
FIG. 2 is a block diagram depicting components of a road defect and asset detection system in some embodiments.

FIG. 2 is a block diagram depicting components of the road defect and asset detection system 104 in some embodiments. The road defect and asset detection system 104 may include a communication module 202, an image processing module 204, a road defect and asset detection module 206, and a road defect and asset detection model training module 208. The road defect and asset detection system 104 may further include a road defect and asset aggregation module 210, a road defect and asset location module 212, an image segmentation module 214, and a reporting module 216. The road defect and asset detection system 104 may further include a user interface module 218, a road defect and asset verification module 220, and a data storage 224.

The communication module 202 may send requests and/or data between the road defect and asset detection system 104 and any of the image sources 102, the department of transportation system 106, and the 360-degree camera system 110. The communication module 202 may also receive requests and/or data from any of the road defect and asset detection system 104 and any of the image sources 102, the department of transportation system 106, and the 360-degree camera system 110.

The image processing module 204 may process images, such as 360-degree images, to generate non-360-degree images. The non-360-degree images may be two-dimensional (2D) images representing front and/or back views of the 360-degree images. The road defect and asset detection module 206 may apply one or more trained AI and/or ML models to the generated images. The road defect and asset detection model training module 208 may train one or more AI and/or ML models to detect road defects and road assets and store the one or more trained AI and/or ML models in the data storage 224.

The road defect and asset aggregation module 210 may aggregate or merge road defects and/or road assets that are detected in multiple images. The road defect and asset location module 212 may locate road defects and road assets. The image segmentation module 214 may segment generated images to identify, for example, portions of roads. The reporting module 216 may generate reports and data, such as road defect location data and images of road defects.

The user interface module 218 may provide user interfaces that display detected road defects and road assets. The road defect and asset verification module 220 may provide detected road defects and road assets for manual verification and receive manual verifications of road defects and road assets.

The data storage 224 may include data stored, accessed, and/or modified by any of the modules of the road defect and asset detection system 104. The data storage 224 may include any number of data storage structures such as tables, databases, lists, and/or the like. The data storage 224 may include data that is stored in memory (for example, random access memory (RAM)), on disk, or some combination of in-memory and on-disk.

A module of the road defect and asset detection system 104 may be hardware, software, firmware, or any combination. For example, each module may include functions performed by dedicated hardware (for example, an Application-Specific Integrated Circuit (ASIC), a Field Programmable Gate Array (FPGA), or the like), software, instructions maintained in ROM, and/or any combination. Software may be executed by one or more processors. Although a limited number of modules are depicted in FIG. 2, there may be any number of modules. Further, individual modules may perform any number of functions, including functions of multiple modules as described herein.

Figure 3:
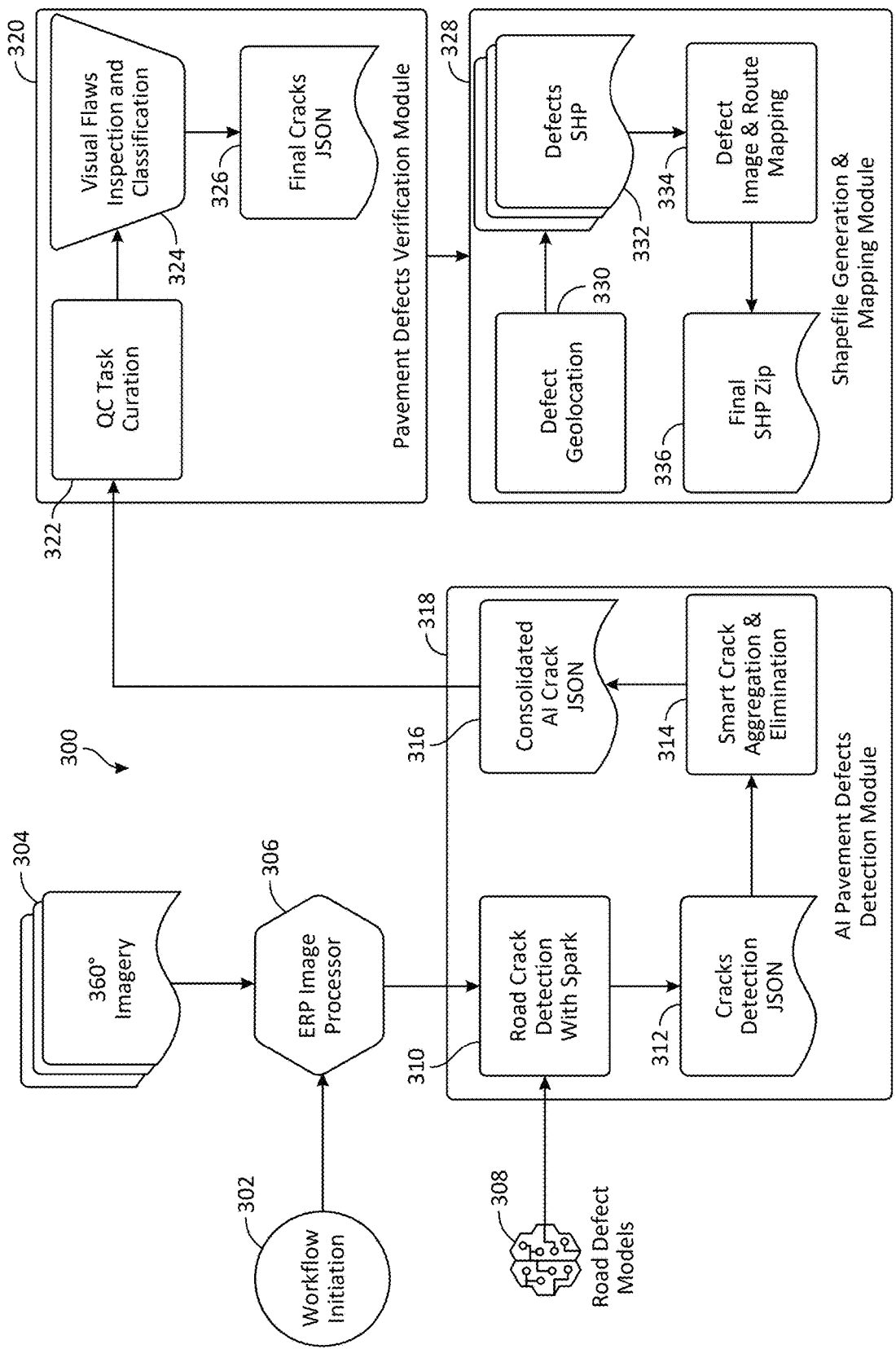
FIG. 3 is a diagram depicting a system and a method for detecting road defects in some embodiments.

FIG. 3 is a diagram depicting a system and a method 300 for detecting road defects in some embodiments. The method 300 may be performed by the road defect and asset detection system 104 (for example, various modules of the road defect and asset detection system 104). The method 300 may begin at a workflow initiation 302 with the image processing module 204 receiving 360-degree images 304. The image processing module 204 may receive the 360-degree images 304 from one or more of the image sources 102. The image processing module 204 may generate front and/or back perspective images from the 360-degree images 304, which may facilitate data labeling and model inference tasks.

The image processing module 204 may generate distinct front and back images from a 360-degree image 304. In one example, the image processing module 204 utilizes an Equirectangular Projection Algorithm to generate the front and back images. To continue this example, for the processing of these equirectangular images, a three-dimensional transformation may be employed, utilizing a specialized three dimensional (3D) Rotation Matrix. This matrix may be utilized to project the two dimensional (2D) equirectangular image onto a 3D spherical model. The image processing module 204 may utilize the equations $(_1)$ and (2) below:

$$\phi - \text{Rotation Matrix} = \begin{pmatrix} \cos(\phi) & -\sin(\theta)\sin(\phi) & \cos(\theta)\sin(\phi) \\ -\sin(\theta)\sin(\phi) & \cos(\phi)+\cos^2(\theta)(1-\cos(\phi)) & \cos(\theta)\sin(\theta)(1-\cos(\phi)) \\ \cos(\theta)\sin(\phi) & \cos(\phi)+\sin(\theta)(1-\cos(\phi)) & \cos(\phi)+\sin^2(\theta)(1-\cos(\phi)) \end{pmatrix} \quad \text{Equation (1)}$$

$$\theta - \text{Rotation Matrix} = \begin{pmatrix} 1 & 0 & 0 \\ 0 & \cos(\theta) & -\sin(\theta) \\ 0 & \sin(\theta) & \cos(\theta) \end{pmatrix} \quad \text{Equation (2)}$$

By applying this transformation, the image processing module 204 may adjust the image based on a predetermined rotation angle, effectively extracting the desired viewpoint from a 360-degree image 304. The image processing module 204 may thus produce a set of processed images.

The road defect and asset detection system 104 (for example, the road defect and asset detection module 206) may apply one or more road defect models 308 to the set of processed images to detect road defects (such as cracks) at step 310. There may be any number of models for detecting four types of cracks (e.g., transverse, seal, longitudinal, and alligator). Any model or combination of the models may be applied to the set of processed images (e.g., each of the four models may be applied to the set of processed images).

In some embodiments, the road defect and asset detection system 104 may utilize the following to one, some, or all of the following to perform inference: YOLOv8 for detecting objects in images; PySpark for handling large datasets and processing images in a distributed computing environment, thereby ensuring scalability and efficiency; Kubernetes, which may facilitate deployment, scaling, and management of the road defect and asset detection system 104, thereby allowing the road defect and asset detection system 104 to handle high volumes of data; a deep learning convolutional neural network, which may process segmented images to identify defects and assets (e.g., the convolutional neural network may be trained to recognize major road defects including, for example, alligator cracks, longitudinal cracks, seal cracks, and transverse cracks); and the Segment Anything Model by Meta of California, United States, which is a segmentation model that may isolate relevant features in the images. The road defect and asset detection system 104 may also utilize the following: Jenkins Trigger, which may automate the workflow, initiating the processing pipeline upon new data arrival or according to a schedule; and Canny Edge Map, which is an image processing technique applied to enhance the detection of edges in the images, which may aid in the identification of road defects. Although specific software and/or approaches are mentioned herein (e.g., YOLOv9 and the Segment Anything Model), it will be appreciated that different software and/or approaches may be applied for inference.

At step 312, the road defect and asset detection system 104 produces a JSON for each detected defect. At step 314, the road defect and asset detection system 104 (for example, the road defect and asset aggregation module 210) performs defect aggregation and elimination. The road defect and asset detection system 104 may combine detections from different models using an ensemble approach. The road defect and asset detection system 104 may leverage IoU (Intersection over Union) and confidence scores to identify the most accurate representation of each defect. The road defect and asset detection system 104 may adjust the merging process based on preferences and priorities provided by a department of transportation system 106. The road defect and asset detection system 104 may also perform continuous crack merging by identifying and merging long, continuous cracks detected across multiple consecutive images. The road defect and asset detection system 104 may employ similarity metrics and crack geometry analysis to ensure accurate merging. At step 316 the road defect and asset detection system 104 may produce a consolidated defect JSON.

The road defect and asset detection system 104 (for example, the road defect and asset verification module 220) may perform quality verification at step 322, step 324, and step 326. The road defect and asset detection system 104 may provide interfaces for verifying defects and receiving verifications of defects by, for example, human quality control technicians. For example, a quality control technician may review an interface that displays an image including a road defect and an identifier of the road defect. The quality control technician may confirm the road defect or disallow the road defect. The quality control technician may also identify additional road defects not identified by the road defect and asset detection system 104. The road defect and asset detection system 104 may produce a final defects JSON at step 326 that identifies the road defects.

The road defect and asset detection system 104 (for example, the road defect and asset location module 212) may geolocate defects at step 330. The road defect and asset location module 212 may utilize an asset geolocation post-processing algorithm to accurately geotag defects within images for precise spatial referencing. The asset geolocation post-processing algorithm may utilize computer vision techniques and algorithms to ensure that each defect is correctly positioned in a three-dimensional space. For example, the road defect and asset location module 212 may utilize 3D triangulation and depth estimation techniques to locate defects. The road defect and asset detection system 104 may geolocate defects so that applications requiring high-precision mapping and asset management, such as urban planning, infrastructure management, and augmented reality implementations, may utilize the geolocated defects.

In some embodiments, the road defect and asset detection system 104 may read Global Positioning System (GPS) data tagged in images which may provide an initial estimate of the location of the defect. The road defect and asset detection system 104 may correct lens distortions using camera calibration techniques to improve the accuracy of subsequent steps. The road defect and asset detection system 104 may detect features within an image using algorithms such as, but not limited to, SIFT, SURF, or ORB.

The road defect and asset detection system 104 may match detected features across multiple images to establish correspondence. The road defect and asset detection system 104 may utilize epipolar geometry and triangulation to generate a matrix using matched feature points, which may facilitate the triangulation of points in 3D space using camera parameters. In some embodiments, the road defect and asset detection system 104 may utilize camera parameters in Table 1 to assist in locating road defects.

TABLE 1

| Parameter Type | Parameter Name | Parameter Value |
|---|---|---|
| Intrinsic | Focal Length (f) | 4.4 mm |
| Intrinsic | Principal Point (cx, cy) | Varies (e.g., in pixels) |
| Intrinsic | Lens Distortion Coefficients | Assumed 0 for the Region of Interest |
| Intrinsic | Pixel Size | Varies from 24 cm near camera |
| Extrinsic | Camera Position (X, Y, Z) | Varies for each Image captured 4 m apart |
| Extrinsic | Camera Height | 2.01 m from the ground |
| Extrinsic | Rotation Angles (Roll, Pitch, Yaw) | (0, 0, 180) in order |
| Extrinsic | View Direction | Back view of Car for minimal interference by the car body |
| Extrinsic | Field Of View | 60.0 |

The road defect and asset detection system 104 may refine the positions of 3D points and camera parameters using bundle adjustment, which may aid in accurate reconstruction. The road defect and asset detection system 104 may align the 3D model with real-world coordinates (e.g., utilizing the GPS data), thereby ensuring that each asset is accurately placed within a global context.

In some embodiments, the road defect and asset detection system 104 performs checks (for example, chirality checks) to ensure that reconstructed points are physically plausible and located in front of the camera. It will be appreciated that the road defect and asset detection system 104 may apply noise reduction and smoothing techniques to the 3D model, which may enhance the quality and accuracy of the asset geolocation.

In various embodiments, the road defect and asset detection system 104 may generate a defects shapefile 332 (although any type and/or format of file may be generated). The road defect and asset detection system 104 may perform defect image and route mapping at step 334. The road defect and asset detection system 104 may perform this operation to ensure that each defect is accurately mapped to a specific route, and an image of the defect is clipped.

The road defect and asset detection system 104 may leverage an ensemble approach to merge defects, such as cracks, from different models based on IoU and confidence scores. For example, the road defect and asset detection system 104 may detect one type of crack using a first trained model and another type of crack using a second trained model. Based on the confidence scores attributed to each crack and a determination of whether an IoU for the two cracks exceeds a threshold, the road defect and asset detection system 104 may determine whether to merge the two cracks into a single crack or keep the two cracks separate. Other techniques to determine whether to merge or not merge cracks will be apparent.

The road defect and asset detection system 104 may utilize geospatial nearest neighbor mapping to accurately link each defect to its corresponding route on the road network. Further, the road defect and asset detection system 104 may estimate the angular orientation of the defect relative to the driving direction for additional insights. The road defect and asset detection system 104 may apply camera rotation if necessary to align captured images with the actual defect position on the road. The road defect and asset detection system 104 may also crop each defect image precisely based on its location and estimated orientation, ensuring focused and informative data for further analysis.

The road defect and asset detection system 104 may produce a final shapefile 336, which may be in a ZIP format (although, as discussed herein, any type of format of the output may be generated). In this example, the final shapefile 336 may include, for each defect, location data that indicates one or more locations of the defect and an image that includes the defect. The road defect and asset detection system 104 may then provide the location data and the image to the department of transportation system 106.

Method 300 of FIG. 3 is described with respect to detecting road defects but the road defect and asset detection system 104 may also utilize the method 300 to detect road assets, such as pavement markers and road signs. For example, at step 314 the road defect and asset detection system 104 may perform duplicate road sign removal to eliminate duplicate detections of road signs using image similarity techniques. As another example, at step 330, the road defect and asset detection system 104 may utilize geospatial nearest neighbor mapping to accurately link each asset to its corresponding route on the road network. The road defect and asset detection system 104 may estimate the angular orientation of the asset relative to the driving direction for additional insights. The road defect and asset detection system 104 may apply camera rotation if necessary to align captured images with the actual asset position on or proximate to the road. Other additions or changes to the method 300 will be apparent.

Figure 4:
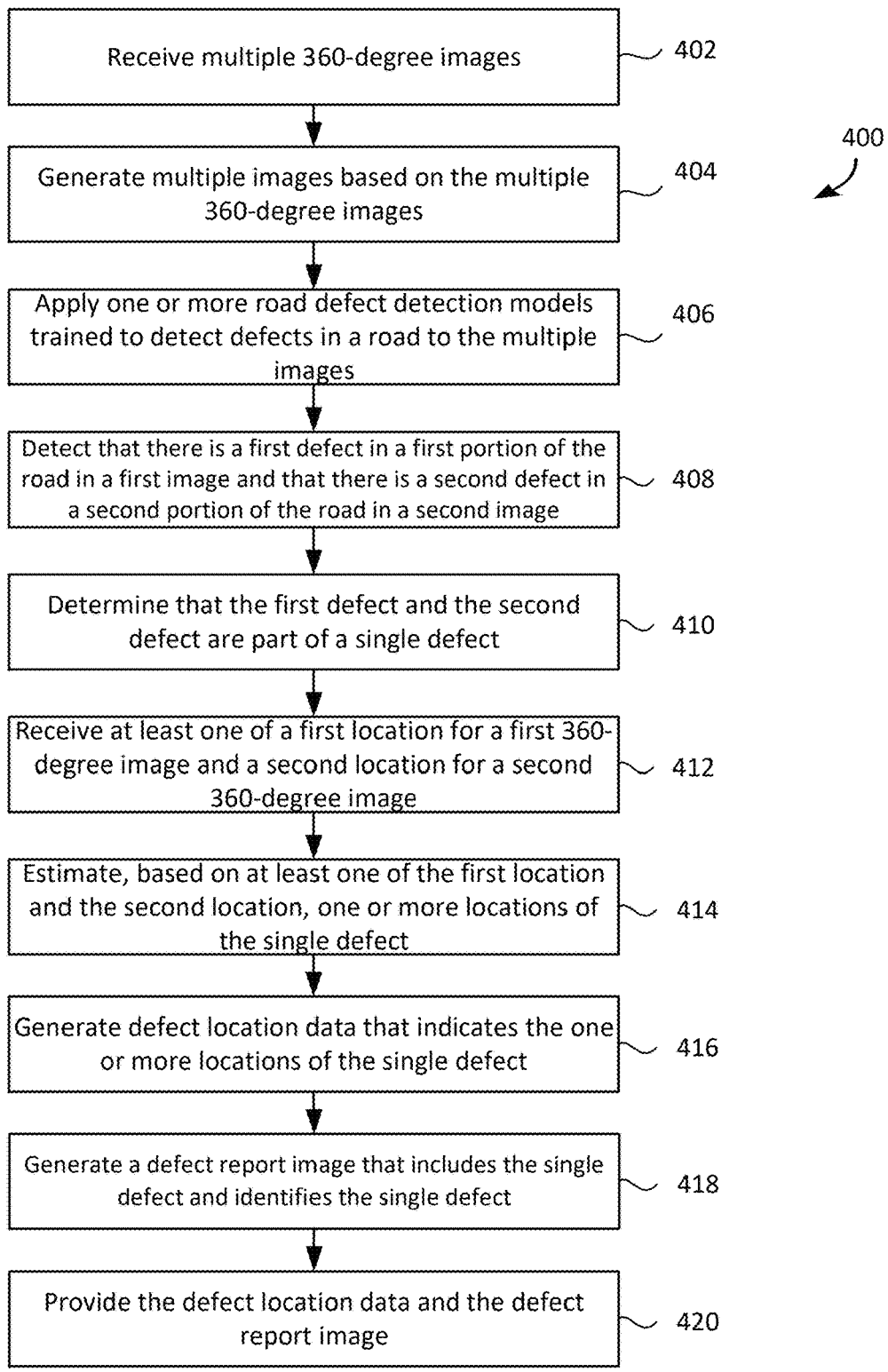
FIG. 4 is a flow diagram depicting a method for generating and providing road defect and/or road asset location data and road defect and/or road asset images in some embodiments.
Figure 5A:
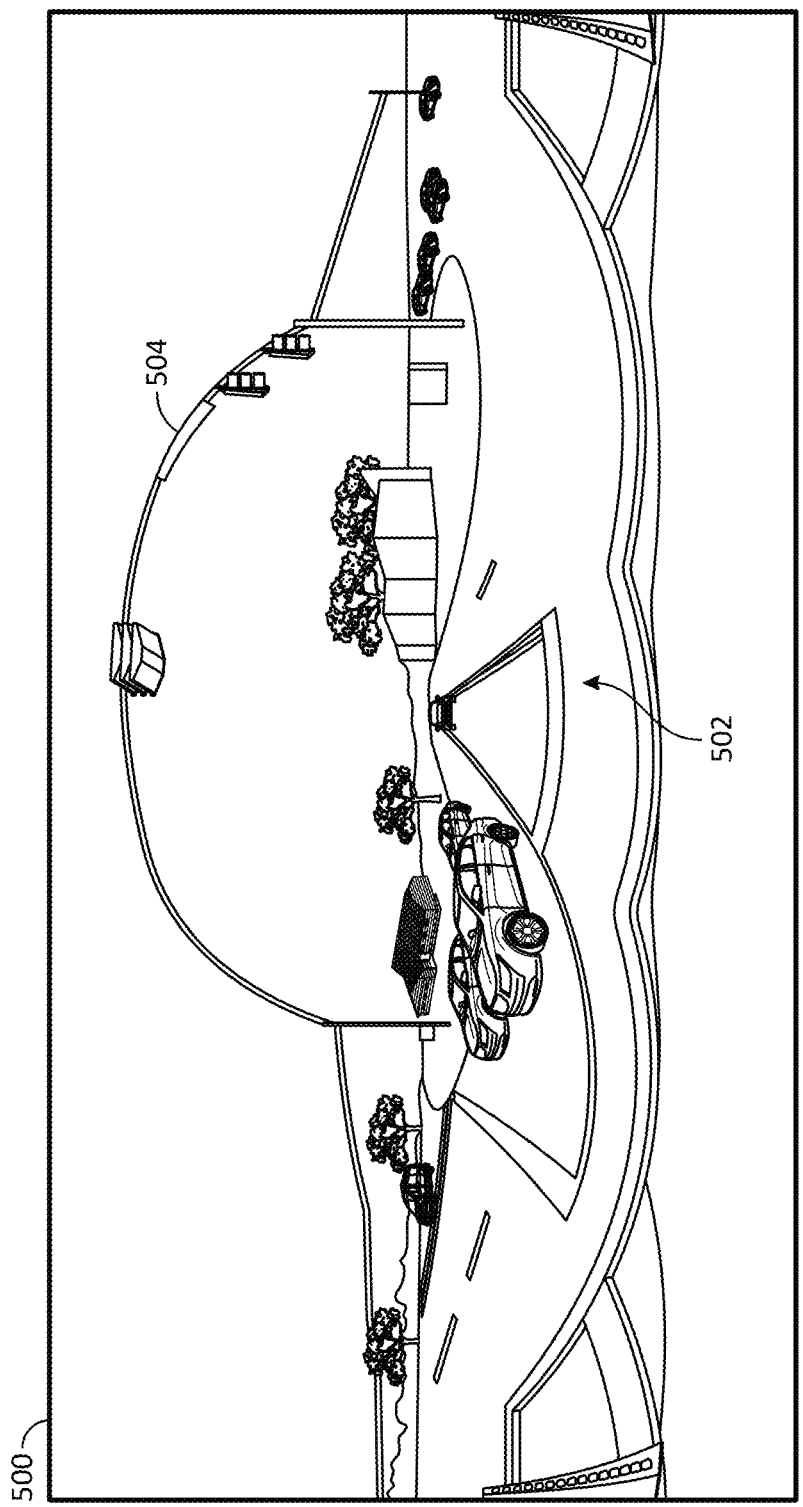
FIG. 5A depicts a 360-degree image that may be utilized by a road defect and asset detection system in some embodiments.

FIG. 4 is a flow diagram depicting method 400 for generating and providing road defect and/or road asset location data and road defect and/or road asset images in some embodiments. At step 402, the road defect and asset detection system 104 receives multiple 360-degree images, each 360-degree image including a portion of a road. A 360-degree image has been captured by one or more 360-degree camera systems 110 and has a timestamp and a location at which the one or more 360-degree camera systems 110 captured the 360-degree image. FIG. 5A depicts a 360-degree image 500 that may be utilized by the road defect and asset detection system 104 in some embodiments. The 360-degree image 500 includes a portion of road 502 and a road asset 504, which is a road sign.

Returning to FIG. 4, at step 404 the road defect and asset detection system 104 generates multiple images based on the multiple 360-degree images. For example, the road defect and asset detection system 104 may use Equation (1) and/or Equation (2) to convert a 360-degree image into multiple 2D images. At least one of the multiple 2D images (for example, an image of a front view or an image of a back view) may include the portion of the road that is in the corresponding 360-degree image. The road defect and asset detection system 104 may order the multiple images by timestamps of the corresponding 360-degree images, so that the multiple images are ordered by the capture timestamp. The ordering of images allows the road defect and asset detection system 104 to merge cracks in multiple successive images.

While the steps in FIG. 4 describe 360-degree images, it will be appreciated that any images at any number of degrees may be used. For example, 180-degree images may be utilized (e.g., two 180-degree images), 45-degree images, 90-degree images, and/or the like.

Figure 5B:
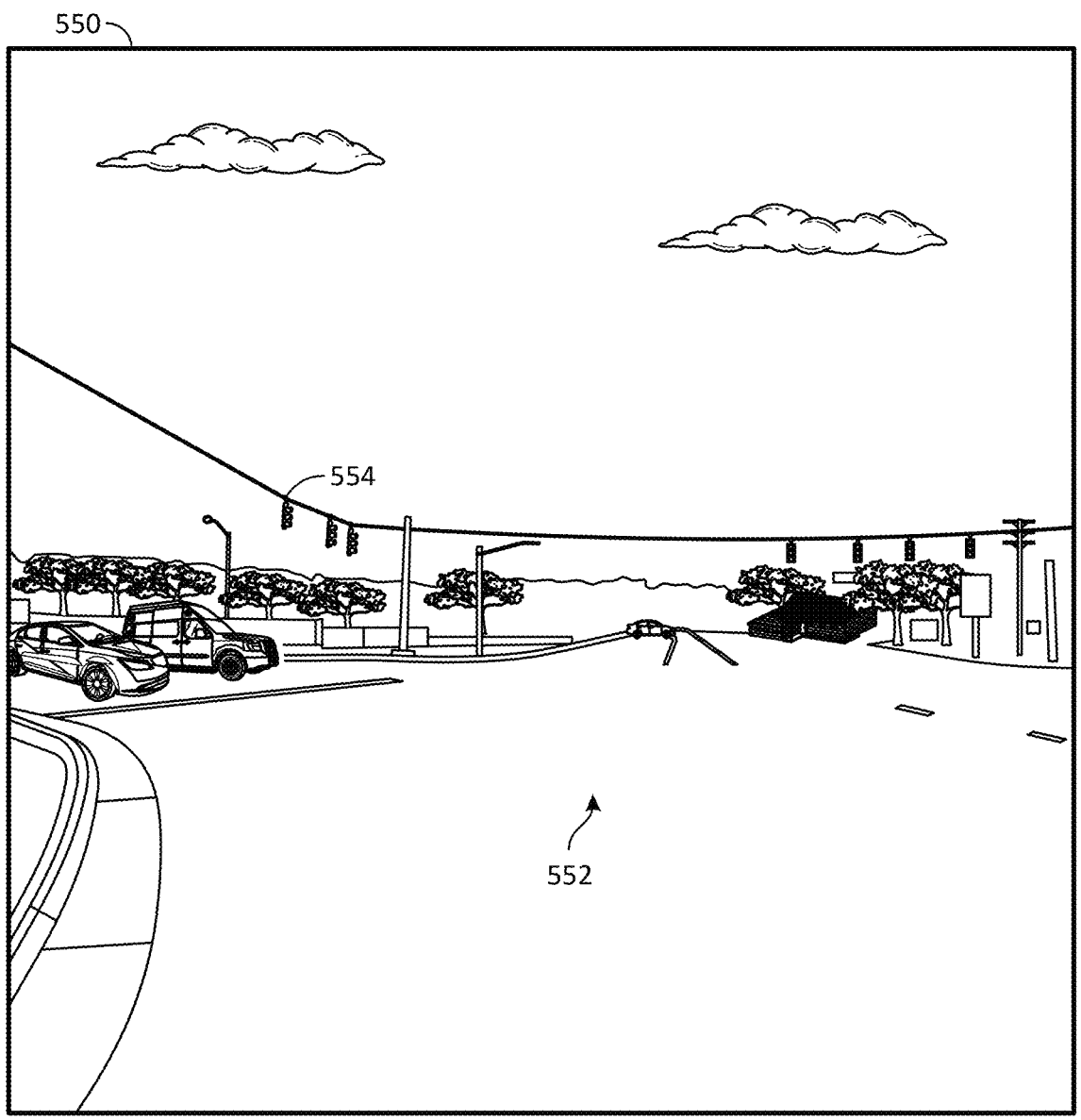
FIG. 5B depicts an image, generated from a 360-degree image, that may be utilized by a road defect and asset detection system in some embodiments.

FIG. 5B depicts an image 550 that may be utilized by the road defect and asset detection system 104 in some embodiments. The image 550 includes a portion of a road 552 and a road asset 554, which is a traffic light.

Returning to FIG. 4, at step 406 the road defect and asset detection system 104 (for example, the road defect and asset detection module 206) applies one or more road defect detection models trained to detect defects in a road to the multiple images. The one or more road defect detection models may include one or more road crack detection models trained to detect cracks in a road. The road defect and asset detection system 104 applying the one or more road defect detection models trained to detect defects in the road to the multiple images may include the road defect and asset detection system 104 applying the one or more road crack detection models trained to detect cracks in the road to the multiple images.

The one or more road crack detection models trained to detect cracks in a road may include a first road crack detection model trained to detect alligator cracks in the road, a second road crack detection model trained to detect longitudinal cracks in the road, a third road crack detection model trained to detect seal cracks in the road, and a fourth road crack detection model trained to detect transverse cracks in the road.

At a step 408 the road defect and asset detection system 104 detects, based on applying the one or more road defect detection models to the multiple images, that there is a first defect in a first portion of the road in a first image and that there is a second defect in a second portion of the road in a second image. The second image is ordered immediately after the first image, meaning that there is no intermediate image between the first image and the second image in terms of capture timestamp. The road defect and asset detection system 104 detecting, based on applying the one or more road defect detection models to the multiple images, that there is the first defect in the first portion of the road in the first image and that there is the second defect in the second portion of the road in the second image may include the road defect and asset detection system 104 detecting, based on applying the one or more road crack detection models to the multiple images, that there is a first crack in the first portion of the road in the first image and that there is a second crack in the second portion of the road in the second image.

Figure 6:
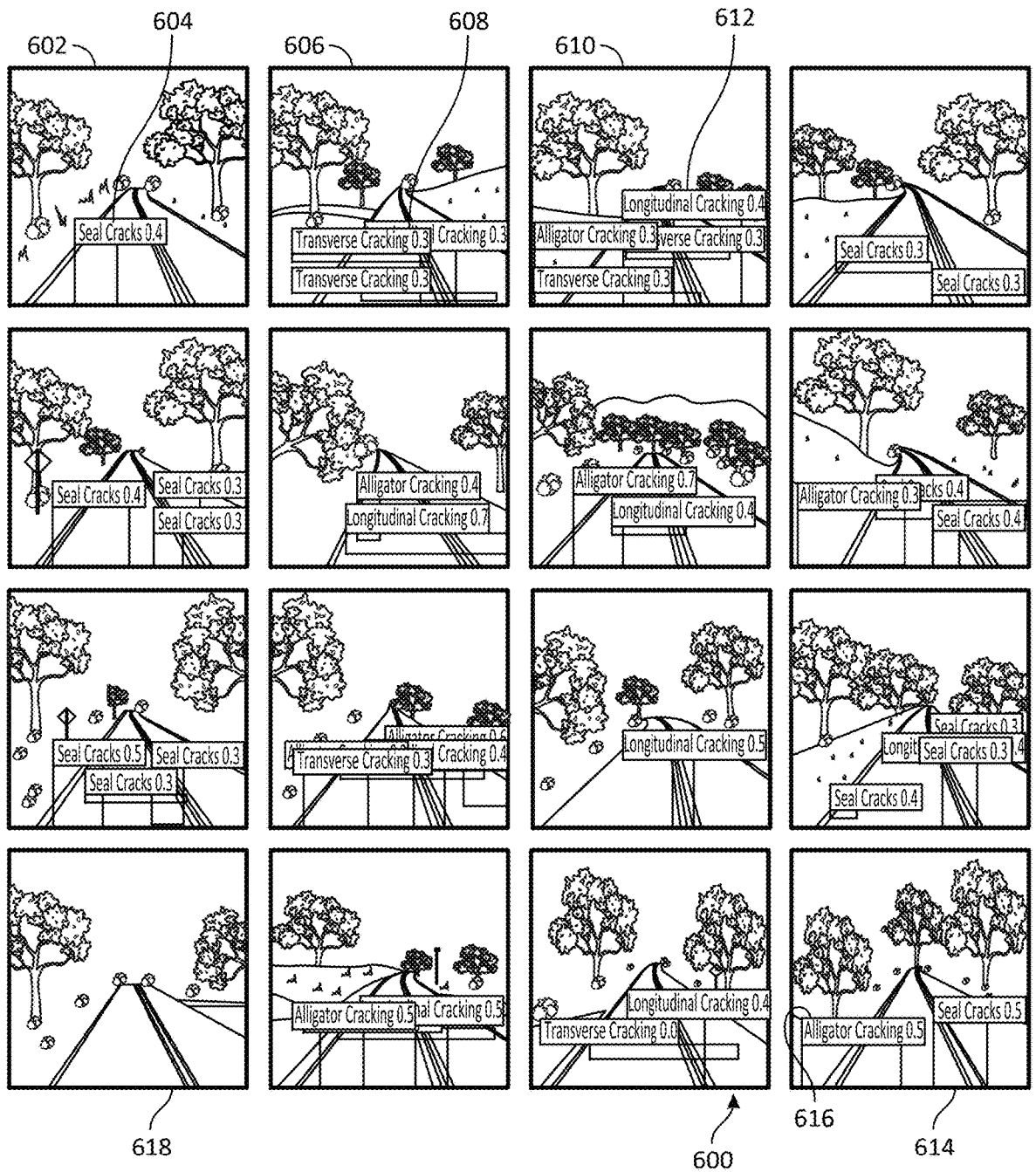
FIG. 6 depicts multiple images in which road defects have been detected by a road defect and asset detection system in some embodiments.

FIG. 6 depicts multiple images 600 in which road defects have been detected by a road defect and asset detection system in some embodiments. The multiple images 600 include an image 602, which includes a detected defect 604 (a seal crack), an image 606, which includes a detected defect 608 (a transverse crack), an image 610, which includes a detected defect 612 (a longitudinal crack), and an image 614, which includes a detected defect 616 (an alligator crack). Each of the defects in the multiple images 600 is indicated by a bounding box with a label and a confidence score ranging from 0 to 1, inclusive. The multiple images 600 also include an image 618 in which the road defect and asset detection system 104 detected no defects.

Returning to FIG. 4, at a step 408 the road defect and asset detection system 104 (for example, the road defect and asset detection module 206) detects, based on applying the one or more road defect detection models to the multiple images, that there is a first defect in a first portion of the road in a first image and that there is a second defect in a second portion of the road in a second image. The second image is ordered immediately after the first image in terms of capture timestamp. At a step 410 the road defect and asset detection system 104 (for example, the road defect and asset aggregation module 210) determines that the first defect and the second defect are part of a single defect. At a step 412 the road defect and asset detection system 104 receives at least one of a first location for a first 360-degree image corresponding to the first image and a second location for a second 360-degree image corresponding to the second image.

At a step 414 the road defect and asset detection system 104 (for example, the road defect and asset location module 212) estimates, based on at least one of the first location and the second location, one or more locations of the single defect. At a step 416 the road defect and asset detection system 104 (for example, the road defect and asset location module 212) generates defect location data that indicates the one or more locations of the single defect. At a step 418 the road defect and asset detection system 104 (for example, the reporting module 216) generates a defect report image that includes the single defect and identifies the single defect. At a step 420 the road defect and asset detection system 104 (for example, the reporting module 216) provides the defect location data and the defect report image, for example, to a department of transportation system 106.

The road defect and asset detection system 104 may also perform additional steps not illustrated in FIG. 4. For example, in some embodiments, the road defect and asset detection system 104 generating the report image may include the road defect and asset detection system 104 identifying a 360-degree image having a location that is closest to the one or more locations of the single defect and utilizing the 360-degree image having the location that is closest to the one or more locations of the single defect to generate the report image. The road defect and asset detection system 104 generating the report may further include the road defect and asset detection system 104 determining an angle between a driving direction of a vehicle on which the one or more 360-degree camera systems was mounted and the single defect and utilizing the angle to generate the report image based on the 360-degree image.

In some embodiments, the road defect and asset detection system 104 (for example, the road defect and asset detection module 206) may generate confidence scores for defects. The road defect and asset detection system 104 may receive a first confidence score for the first defect and a second confidence score for the second defect. The road defect and asset detection system 104 may determine an intersection over union for the first defect and the second defect. The road defect and asset detection system 104 may determine that the first defect and the second defect are part of the single defect by determining that the first confidence score is greater than the second confidence score and determining that the intersection over union (IoU) exceeds a threshold.

According to certain embodiments, the road defect and asset detection system 104 may perform the following additional steps not illustrated in FIG. 4. The road defect and asset detection system 104 (for example, the road defect and asset detection module 206) may apply one or more sign detection models trained to detect signs on or proximate to a road to the multiple image and detect, based on applying the one or more sign detection models to the multiple images, that there is a sign in a third image. The road defect and asset detection system 104 (for example, the road defect and asset detection module 206) may receive a third location for a third 360-degree image corresponding to the third image and estimate, based on the third location, one or more sign locations of the sign. The road defect and asset detection system 104 (for example, the reporting module 216) may generate sign location data that indicates the one or more sign locations of the sign and provide the sign location data.

In some embodiments, the road defect and asset detection system 104 (for example, the image segmentation module 214) may segment images using a segmentation model (for example, the Segment Anything Model by Meta) and identify, based on segmenting the multiple images, portions of the road in the multiple images. The road defect and asset detection system 104 (for example, the road defect and asset detection module 206) may apply the one or more road defect detection models trained to detect defects in the road to the multiple images by applying the one or more road defect detection models to the portions of the road in the multiple images identified by the segmenting.

Figure 7:
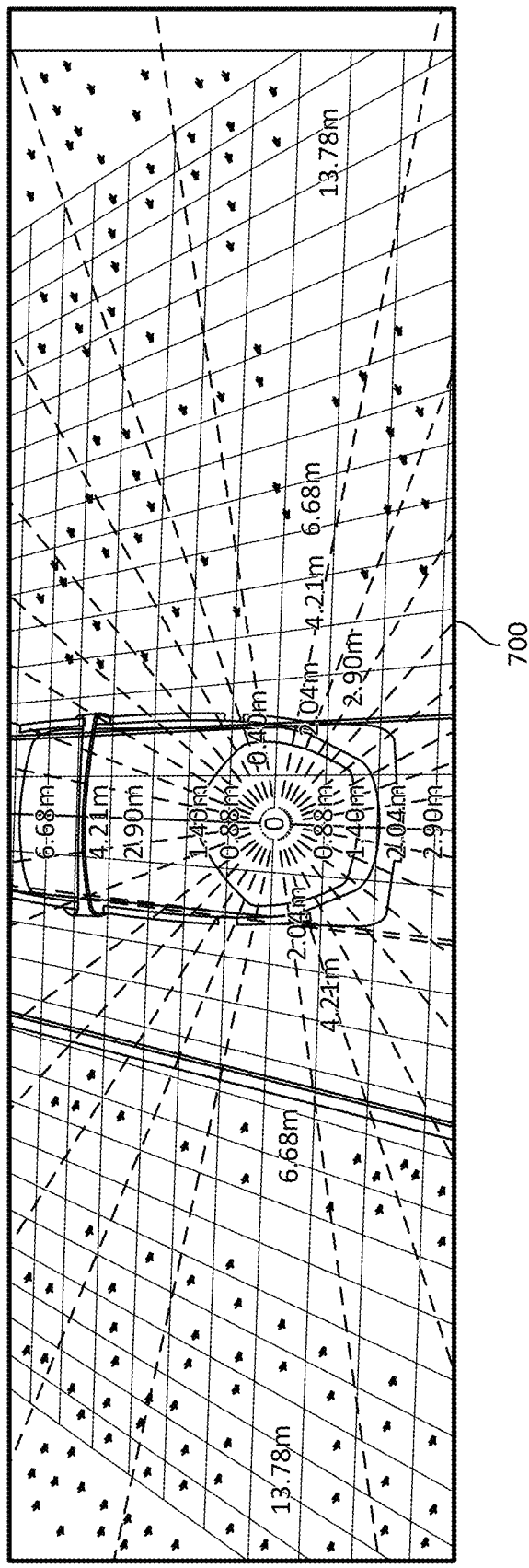
FIG. 7 depicts a projection that may be utilized by a road defect and asset detection system to estimate locations of road defects in some embodiments.

In some embodiments, the road defect and asset detection system 104 may estimate, based on at least one of the first location and the second location, the one or more locations of the single defect by the following: The road defect and asset detection system 104 may detect first features in the first image and second features in the second image, match at least some of the first features in the first image with at least some of the second features in the second image, generate a matrix using at least some of the first features that are matched with at least some of the second features, determine, using the matrix, one or more positions of the single defect, and align, based on least one of the first location and the second location, the one or more positions of the single defect to obtain the one or more locations of the single defect. FIG. 7 depicts a projection 700 that may be utilized by a road defect and asset detection system to estimate locations of road defects in some embodiments.

Figure 8:
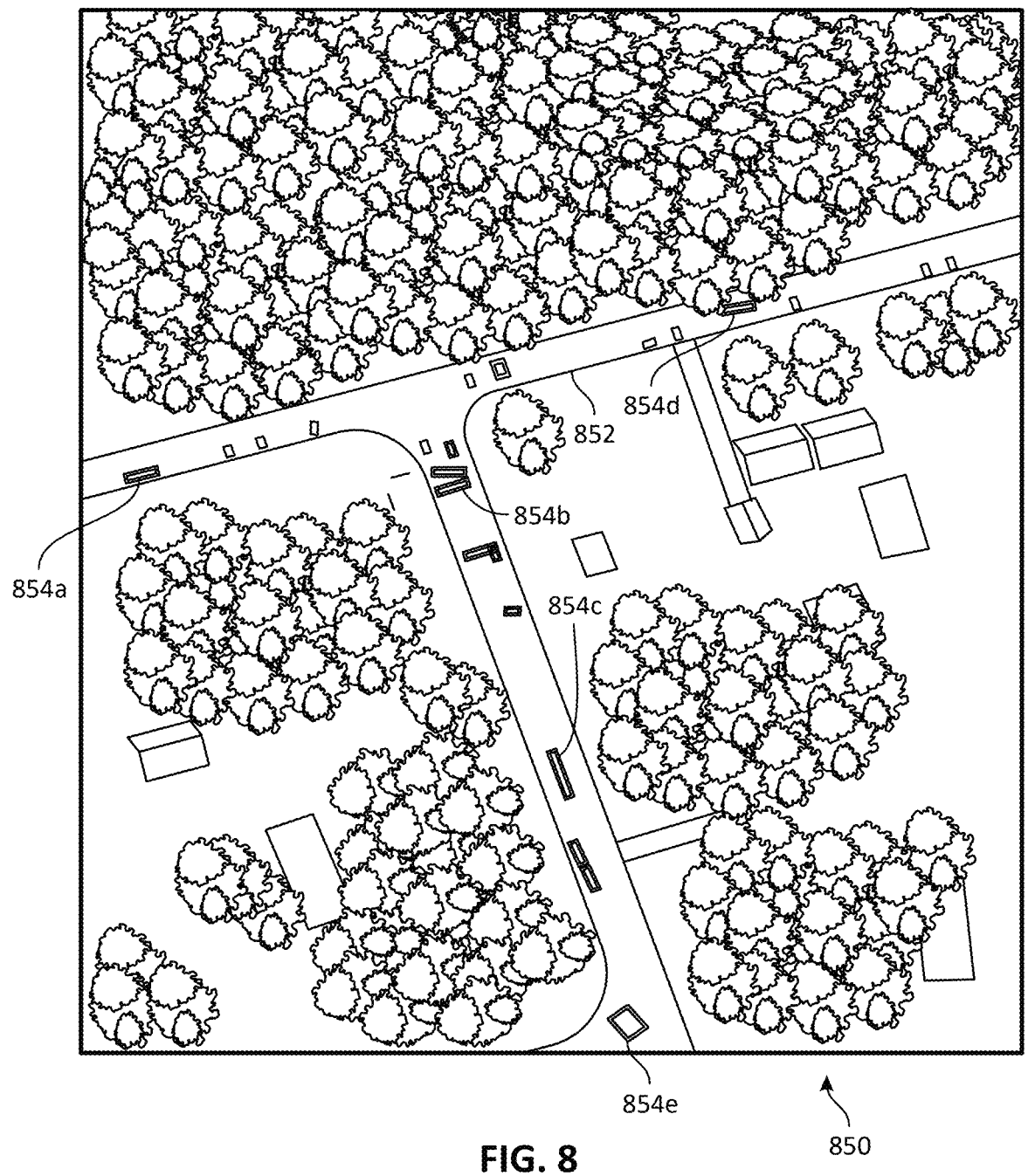
FIG. 8 depicts a view of multiple road defects that may be provided by a road defect and asset detection system in some embodiments.

FIG. 8 depicts a view 850 of multiple road defects that may be provided by a road defect and asset detection system in some embodiments. The defects in a road 852 include a defect 854a, a defect 854b, a defect 854c, a defect 854d, and a defect 854e. The view 850 also includes multiple road defects that are not labeled with reference characters. The road defect and asset detection system 104 may generate a shapefile that has the locations of the defects and provide the shapefile to, for example, a department of transportation system 106. The department of transportation system 106 may then utilize the shapefile as an overlay that may be utilized by a Geographic Information System (GIS). The GIS may display overlays from shapefiles for a geographic region over maps of the geographic region. Users of the department of transportation system 106 may thus use the overlays to determine which portions of the geographic region are in need of road repair.

Advantages of the road defect and asset detection system 104 and related methods will be apparent. One advantage is that the road defect and asset detection system 104 provides automated and scalable detection of road defects and/or road assets. Another advantage is that the road defect and asset detection system 104 may be utilized to verify or confirm that a road defect has been repaired. The road defect and asset detection system 104 may receive images of a road defect that has been repaired and, by virtue of the absence of a detection of a road defect, may thus confirm that the road defect has been actually repaired.

Figure 9:
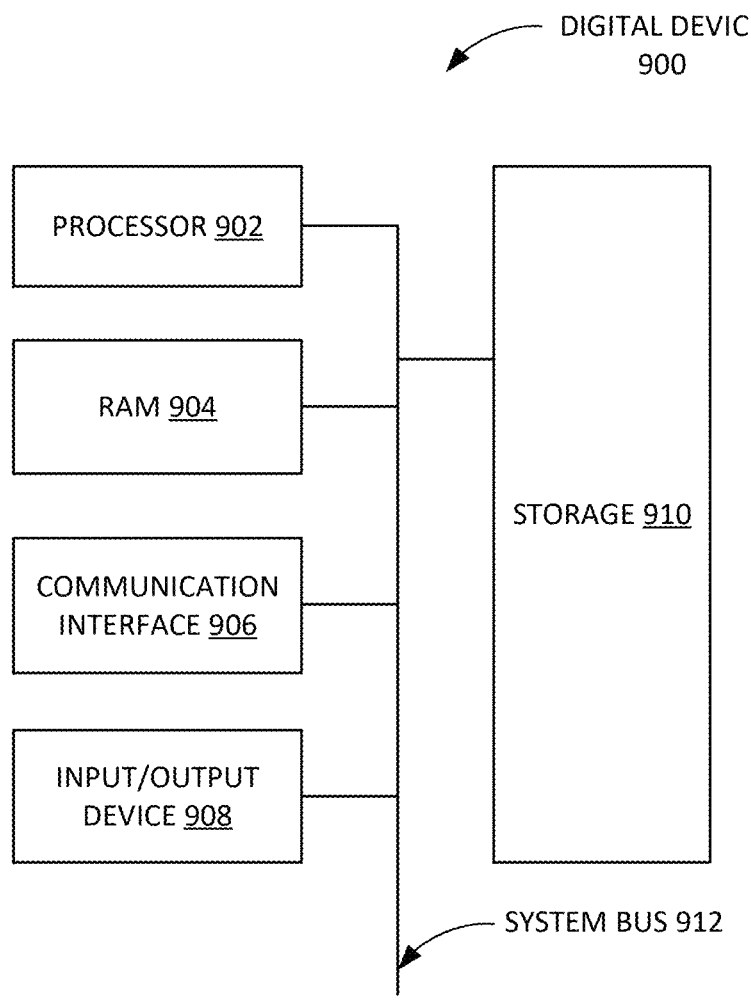
FIG. 9 depicts a block diagram of an example digital device in some embodiments.

FIG. 9 depicts a block diagram of an example digital device 900 according to some embodiments. The digital device 900 is shown in the form of a general-purpose computing device. The digital device 900 includes at least one processor 902, RAM 904, communication interface 906, input/output device 908, storage 910, and a system bus 912 that couples various system components including storage 910 to the at least one processor 902. A system, such as a computing system, may be or include one or more of the digital device 900.

System bus 912 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The digital device 900 typically includes a variety of computer system readable media, such as computer system readable storage media. Such media may be any available media that is accessible by any of the systems described herein and it includes both volatile and nonvolatile media, removable and non-removable media.

In some embodiments, the at least one processor 902 is configured to execute executable instructions (for example, programs). In some embodiments, the at least one processor 902 comprises circuitry or any processor capable of processing the executable instructions.

In some embodiments, RAM 904 stores programs and/or data. In various embodiments, working data is stored within RAM 904. The data within RAM 904 may be cleared or ultimately transferred to storage 910, such as prior to reset and/or powering down the digital device 900.

In some embodiments, the digital device 900 is coupled to a network, such as the communication network 112, via communication interface 906. The digital device 900 can communicate with one or more networks such as a local area network (LAN), a general wide area network (WAN), and/or a public network (for example, the Internet).

In some embodiments, input/output device 908 is any device that inputs data (for example, mouse, keyboard, stylus, sensors, etc.) or outputs data (for example, speaker, display, virtual reality headset).

In some embodiments, storage 910 can include computer system readable media in the form of non-volatile memory, such as read only memory (ROM), programmable read only memory (PROM), solid-state drives (SSD), flash memory, and/or cache memory. Storage 910 may further include other removable/non-removable, volatile/non-volatile computer system storage media. By way of example only, storage 910 can be provided for reading from and writing to a non-removable, non-volatile magnetic media. The storage 910 may include a non-transitory computer-readable medium, or multiple non-transitory computer-readable media, which stores programs or applications for performing functions such as those described herein with reference to, for example, FIG. 2. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 912 by one or more data media interfaces. As will be further depicted and described below, storage 910 may include at least one program product having a set (for example, at least one) of program modules that are configured to carry out the functions of embodiments of the invention. In some embodiments, RAM 904 is found within storage 910.

Programs/utilities, having a set (at least one) of program modules, such as the road defect and asset detection system 104, may be stored in storage 910 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with the digital device 900. Examples include, but are not limited to microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

It will be appreciated that aspects of one or more embodiments may be embodied as a system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled," "couplable," "operably coupled," "communicably coupled" and the like to other components. Such description or illustration should be understood as indicating that such components may cooperate or interact with each other, and may be in direct or indirect physical, electrical, or communicative contact with each other.

Components may be described or illustrated as "configured to," "adapted to," "operative to," "configurable to," "adaptable to," "operable to" and the like. Such description or illustration should be understood to encompass components both in an active state and in an inactive or standby state unless required otherwise by context.

The use of "or" in this disclosure is not intended to be understood as an exclusive "or." Rather, "or" is to be understood as including "and/or." For example, the phrase "providing products or services" is intended to be understood as having several meanings: "providing products," "providing services," and "providing products and services."

It may be apparent that various modifications may be made, and other embodiments may be used without departing from the broader scope of the discussion herein. For example, while 360-degree images are described as being used, the road defect and asset detection system 104 may utilize any suitable type of images. As another example, the road defect and asset detection system 104 may utilize the length and/or width bounding boxes to determine whether or not the road defect and asset detection system 104 detects a crack. As another example, confidence scores may be set by requirements of the department of transportation system 106.

Therefore, these and other variations upon the example embodiments are intended to be covered by the disclosure herein.

The invention claimed is:

1. A non-transitory computer-readable medium comprising executable instructions, the executable instructions being executable by one or more processors to perform a method, the method comprising:
   receiving multiple 360-degree images, each 360-degree image including a portion of a road, a 360-degree image captured by one or more 360-degree camera systems and having a timestamp and a location at which the one or more 360-degree camera systems captured the 360-degree image;
   generating multiple images based on the multiple 360-degree images, an image including the portion of the road in a corresponding 360-degree image, the multiple images ordered by timestamps of the corresponding 360-degree images;
   applying one or more road defect detection models trained to detect defects in a road to the multiple images, the road defect detection models employing similarity metrics and crack geometry to identify cracks detected across the multiple images;
   detecting, based on applying the one or more road defect detection models to the multiple images, that there is a first defect in a first portion of the road in a first image and that there is a second defect in a second portion of the road in a second image, the second image ordered immediately after the first image;
   receiving a first confidence score for the first defect;
   receiving a second confidence score for the second defect;
   determining that an intersection over union for the first defect and the second defect exceeds a threshold;
   determining that the first defect and the second defect are part of a single defect based on the first confidence score, the second confidence score, and the intersection over union;
   receiving at least one of a first location for a first 360-degree image corresponding to the first image and a second location for a second 360-degree image corresponding to the second image;
   estimating, based on at least one of the first location and the second location, one or more estimated locations of the single defect;
   generating defect location data that indicates the one or more estimated locations of the single defect;
   generating a defect report image that includes the single defect and identifies the single defect; and
   providing the defect location data and the defect report image, thereby allowing defects in the road to be identified.

2. The non-transitory computer-readable medium of claim 1, wherein:
   the one or more road defect detection models include one or more road crack detection models trained to detect cracks in a road,
   applying the one or more road defect detection models trained to detect defects in the road to the multiple images includes applying the one or more road crack detection models trained to detect cracks in the road to the multiple images, and
   detecting, based on applying the one or more road defect detection models to the multiple images, that there is the first defect in the first portion of the road in the first image and that there is the second defect in the second portion of the road in the second image includes detecting, based on applying the one or more road crack detection models to the multiple images, that there is a first crack in the first portion of the road in the first image and that there is a second crack in the second portion of the road in the second image.

3. The non-transitory computer-readable medium of claim 2 wherein the one or more road crack detection models trained to detect cracks in a road include:
   a first road crack detection model trained to detect alligator cracks in the road,
   a second road crack detection model trained to detect longitudinal cracks in the road,
   a third road crack detection model trained to detect seal cracks in the road, and
   a fourth road crack detection model trained to detect transverse cracks in the road.

4. The non-transitory computer-readable medium of claim 1 wherein generating the defect report image includes:
   identifying a 360-degree image having a location that is closest to the one or more estimated locations of the single defect; and
   utilizing the 360-degree image having the location that is closest to the one or more estimated locations of the single defect to generate the defect report image.

5. The non-transitory computer-readable medium of claim 4 wherein generating the defect report image further includes:
   determining an angle between a driving direction of a vehicle on which the one or more 360-degree camera systems was mounted and the single defect; and
   utilizing the angle to generate the defect report image based on the 360-degree image.

6. The non-transitory computer-readable medium of claim 1 wherein the method further comprises:
  detecting, based on applying the one or more road defect detection models to the multiple images, that there is third defect in a third portion of the road in the first image;
  receiving a third confidence score for the third defect;
  determining that the first confidence score is greater than the third confidence score;
  determining that an intersection over union for the first defect and the third defect exceeds a threshold; and
  determining, based on determining that the first confidence score is greater than the third confidence score and determining that the intersection over union for the first defect and the third defect exceeds the threshold, that the third defect is part of the first defect.

7. The non-transitory computer-readable medium of claim 1 wherein the method further comprises:
  applying one or more sign detection models trained to detect signs on or proximate to a road to the multiple images;
  detecting, based on applying the one or more sign detection models to the multiple images, that there is a sign in a third image;
  receiving a third location for a third 360-degree image corresponding to the third image;
  estimating, based on the third location, one or more sign locations of the sign;
  generating sign location data that indicates the one or more sign locations of the sign;
  generating a sign report image that includes the sign and identifies the sign; and
  providing the sign location data and the sign report image.

8. The non-transitory computer-readable medium of claim 1 wherein the method further comprises:
  segmenting the multiple images; and
  identifying, based on segmenting the multiple images, portions of the road in the multiple images,
  wherein applying the one or more road defect detection models trained to detect defects in the road to the multiple images includes applying the one or more road defect detection models to the portions of the road in the multiple images.

9. The non-transitory computer-readable medium of claim 1 wherein estimating, based on at least one of the first location and the second location, the one or more estimated locations of the single defect includes:
  detecting first features in the first image and second features in the second image;
  matching at least some of the first features in the first image with at least some of the second features in the second image;
  generating a matrix using at least some of the first features that are matched with at least some of the second features;
  determining, using the matrix, one or more positions of the single defect; and
  aligning, based on least one of the first location and the second location, the one or more positions of the single defect to obtain the one or more estimated locations of the single defect.

10. A method comprising:
  receiving multiple 360-degree images, each 360-degree image including a portion of a road, a 360-degree image captured by one or more 360-degree camera systems and having a timestamp and a location at which the one or more 360-degree camera systems captured the 360-degree image;
  generating multiple images based on the multiple 360-degree images, an image including the portion of the road in a corresponding 360-degree image, the multiple images ordered by timestamps of the corresponding 360-degree images;
  applying one or more road defect detection models trained to detect defects in a road to the multiple images, the road defect detection models employing similarity metrics and crack geometry to identify cracks detected across the multiple images;
  detecting, based on applying the one or more road defect detection models to the multiple images, that there is a first defect in a first portion of the road in a first image and that there is a second defect in a second portion of the road in a second image, the second image ordered immediately after the first image;
  receiving a first confidence score for the first defect;
  receiving a second confidence score for the second defect;
  determining that an intersection over union for the first defect and the second defect exceeds a threshold;
  determining that the first defect and the second defect are part of a single defect based on the first confidence score, the second confidence score, and the intersection over union;
  receiving at least one of a first location for a first 360-degree image corresponding to the first image and a second location for a second 360-degree image corresponding to the second image;
  estimating, based on at least one of the first location and the second location, one or more estimated locations of the single defect;
  generating defect location data that indicates the one or more estimated locations of the single defect;
  generating a defect report image that includes the single defect and identifies the single defect; and
  providing the defect location data and the defect report image, thereby allowing defects in the road to be identified.

11. The method of claim 10, wherein:
  the one or more road defect detection models include one or more road crack detection models trained to detect cracks in a road,
  applying the one or more road defect detection models trained to detect defects in the road to the multiple images includes applying the one or more road crack detection models trained to detect cracks in the road to the multiple images, and
  detecting, based on applying the one or more road defect detection models to the multiple images, that there is the first defect in the first portion of the road in the first image and that there is the second defect in the second portion of the road in the second image includes detecting, based on applying the one or more road crack detection models to the multiple images, that there is a first crack in the first portion of the road in the first image and that there is a second crack in the second portion of the road in the second image.

12. The method of claim 11 wherein the one or more road crack detection models trained to detect cracks in a road include:
  a first road crack detection model trained to detect alligator cracks in the road,
  a second road crack detection model trained to detect longitudinal cracks in the road, a third road crack detection model trained to detect seal cracks in the road, and a fourth road crack detection model trained to detect transverse cracks in the road.

13. The method of claim 10, wherein generating the defect report image includes:

identifying a 360-degree image having a location that is closest to the one or more estimated locations of the single defect; and utilizing the 360-degree image having the location that is closest to the one or more estimated locations of the single defect to generate the defect report image.

14. The method of claim 13 wherein generating the defect report image further includes:

determining an angle between a driving direction of a vehicle on which the one or more 360-degree camera systems was mounted and the single defect; and utilizing the angle to generate the defect report image based on the 360-degree image.

15. The method of claim 10, further comprising:

receiving a first confidence score for the first defect;

receiving a second confidence score for the second defect; and determining an intersection over union for the first defect and the second defect, wherein determining that the first defect and the second defect are part of the single defect includes determining that the first confidence score is greater than the second confidence score and determining that the intersection over union exceeds a threshold.

16. The method of claim 10, further comprising:

applying one or more sign detection models trained to detect signs on or proximate to a road to the multiple images;

detecting, based on applying the one or more sign detection models to the multiple images, that there is a sign in a third image;

receiving a third location for a third 360-degree image corresponding to the third image;

estimating, based on the third location, one or more sign locations of the sign;

generating sign location data that indicates the one or more sign locations of the sign;

generating a sign report image that includes the sign and identifies the sign; and providing the sign location data and the sign report image.

17. The method of claim 10, further comprising:

segmenting the multiple images; and identifying, based on segmenting the multiple images, portions of the road in the multiple images, wherein applying the one or more road defect detection models trained to detect defects in the road to the multiple images includes applying the one or more road defect detection models to the portions of the road in the multiple images.

18. The method of claim 10 wherein estimating, based on at least one of the first location and the second location, the one or more estimated locations of the single defect includes:

detecting first features in the first image and second features in the second image;

matching at least some of the first features in the first image with at least some of the second features in the second image;

generating a matrix using at least some of the first features that are matched with at least some of the second features;

determining, using the matrix, one or more positions of the single defect; and aligning, based on at least one of the first location and the second location, the one or more positions of the single defect to obtain the one or more estimated locations of the single defect.

19. A system comprising at least one processor and memory containing executable instructions, the executable instructions being executable by the at least one processor to:

receive multiple 360-degree images, each 360-degree image including a portion of a road, a 360-degree image captured by one or more 360-degree camera systems and having a location at which the one or more 360-degree camera systems captured the 360-degree image and a timestamp;

generate multiple images based on the multiple 360-degree images, an image including the portion of the road in a corresponding 360-degree image, the multiple images ordered by timestamps of the corresponding 360-degree images;

apply one or more road defect detection models trained to detect defects in a road to the multiple images, the road defect detection models employing similarity metrics and crack geometry to identify cracks detected across the multiple images;

detect, based on applying the one or more road defect detection models to the multiple images, that there is a first defect in a first portion of the road in a first image and that there is a second defect in a second portion of the road in a second image, the second image ordered immediately after the first image;

receive a first confidence score for the first defect;

receive a second confidence score for the second defect;

determine that an intersection over union for the first defect and the second defect exceeds a threshold;

determine that the first defect and the second defect are part of a single defect based on the first confidence score, the second confidence score, and the intersection over union;

mage and a second location for a second 360-degree image corresponding to the second image;

estimate, based on at least one of the first location and the second location, one or more estimated locations of the single defect;

generate defect location data that indicates the one or more estimated locations of the single defect;

generating a defect report image that includes the single defect and identifies the single defect; and provide the defect location data and the defect report image, thereby allowing defects in the road to be identified.

20. The system of claim 19 wherein:

the one or more road defect detection models include one or more road crack detection models trained to detect cracks in a road, the executable instructions being executable by the at least one processor to apply the one or more road defect detection models trained to detect defects in the road to the multiple images include executable instructions being executable by the at least one processor to apply the one or more road crack detection models trained to detect cracks in the road to the multiple images, and the executable instructions being executable by the at least one processor to detect, based on applying the one or more road defect detection models to the multiple images, that there is the first defect in the first portion of the road in the first image and that there is the second defect in the second portion of the road in the second image includes executable instructions being executable by the at least one processor to detect, based on applying the one or more road crack detection models to the multiple images, that there is a first crack in the first portion of the road in the first image and that there is a second crack in the second portion of the road in the second image.

\* \* \* \* \*